June 7, 1966  E. H. LAND  3,254,999
FORMATION OF PHOTOGRAPHIC IMAGES
Filed April 28, 1959  2 Sheets-Sheet 1

INVENTOR.
Edwin H. Land
BY Brown and Mikulka
Attorneys

June 7, 1966           E. H. LAND           3,254,999

FORMATION OF PHOTOGRAPHIC IMAGES

Filed April 28, 1959           2 Sheets-Sheet 2

INVENTOR.
Edwin H. Land
BY Brown and Mikulka
Attorneys

United States Patent Office 3,254,999
Patented June 7, 1966

3,254,999
FORMATION OF PHOTOGRAPHIC IMAGES
Edwin H. Land, Cambridge, Mass., assignor to Polaroid Corporation, Cambridge, Mass., a corporation of Delaware
Filed Apr. 28, 1959, Ser. No. 809,407
8 Claims. (Cl. 96—2)

This invention relates to a novel process for forming images in color and to photographic film products useful in said process.

The present invention is primarily concerned with a relatively simple, economical and effective additive mehod of synthesizing a colored photographic image in which screen elements of one or of a plurality of colors are preferably employed in conjunction with color-separation, silver-image-forming components to provide an image having desirable color properties and sharp definition. In a preferred embodiment of the process there is included the diffusion transfer of image-forming and color-providing components to a prepared surface. Photographic exposure of photosensitive film elements and the steps involved in the aforesaid diffusion transfer of components are adapted to be performed in a self-processing camera of a type which is capable of applying progressive compression to a film material after its exposure to release a processing fluid thereto. A camera generally suitable for such a purpose, having a wide distribution and thus readily available, is the "Polaroid Land Camera," sold by Polaroid Corporation of Cambridge, Massachusetts, wherein, following a photographic exposure of a photosensitive film material, a positive print is produced in a matter of a few seconds.

The present invention adapts known principles of colored image formation to novel film constructions, i.e., constructions which are particularly suitable for use in the aforesaid rapid diffusion transfer operations. In addition, the invention touches upon certain new concepts of image formation wherein are involved transposed combinations of taking and viewing color media, or means serving as such, to provide reproduction of the original colors of a photographic subject.

In a screen process of a type contemplated in the present invention wherein a diffusion transfer operation is involved and wherein processing of an exposed film material is carried out within internal layers, with no opportunity for visual checkup or manipulation, it is important to insure that a sharp discrimination or demarcation shall exist between the minute screen elements containing both the color-forming and the silver-image-forming components which together provide the colored image or print. Any substantial failure in this regard is certain to be accompanied by a lateral encroachment of components associated with one color into screen areas properly reserved for those associated with another color. The result of such uncontrolled lateral wanderings of color- and silver-image-forming components would, of course, contribute to degradation of both color quality and definition in the photographic print. The present invention contemplates novel procedures for forming a film material embodying a color screen wherein the integrity of the screen elements, throughout the process, is maintained to a degree which is calculated to provide, on a production basis, color prints of highly acceptable commercial grade. Moreover, the process is adapted to provide film materials suitable for use in a self-processing camera of the type hereinbefore described, thus greatly expanding the scope of such a camera into the field of color.

Consistent with the foregoing considerations, one object of the present invention is to provide a screen process for forming photographic images having commercially acceptable color qualities and image definition. Other objects are to provide a process of the character described adapted to the formation of photographic prints, and especially transparencies, through the diffusion transfer of silver-image-forming screen components and additive color-providing screen components; to provide a process of the character described for forming images in color wherein means providing but one transposed wavelength or wherein wavelength control media or stimuli for providing novel transposed wavelength combinations or modified color-separation taking means are employed; to provide a process of the nature described in which the transposed wavelength is substantially monochromatic; to provide such a process in which the steps of photographically exposing a photosensitive emulsion, or emulsions, of the film assembly and of processing the exposed emulsion to develop latent image elements thereof and to provide diffusion transfer of positive image-forming elements to a proper surface are all capable of performance within a camera; to provide a process of the character described in which a plurality of minute, closely spaced screen elements is formed in a geometric pattern and in which transferable color- and image-forming components are caused to diffuse rectilinearly to an image-receiving surface; to provide film material in which dyes are employed for filtering, diffusion and sensitizing purposes in a single layer or in separate layers thereof; to provide a process adapted to the production of film materials of the invention in the form of a continuous strip or a roll; to provide economically and rapidly, a film material comprising photosensitive screen elements in which certain of the more intricate steps of its formation are reserved for performance in the presence of actinic light, while the less complicated steps of manufacture are allocated to performance in the absence of actinic light; to provide a process for forming a film material usable in a diffusion transfer method of producing a colored print in which the orthochromatic emulsion of a film is treated with a solution containing a dye sensitizer and a diffusible dye, the solution being applied in a manner to form a geometric screen; to provide a process for forming a film material comprising a screen for use in a diffusion transfer operation of the nature described in which a first dye sensitizer for one color and a diffusible dye in solution are selectively applied to a color-blind silver halide emulsion thus providing an emulsion which, after exposure, contains a first plurality of screen elements including a diffusible dye and silver-image-forming components, and in which a second dye sensitizer for another color is nonselectively applied throughout the emulsion, including the first plurality of screen elements, the latter substantially refusing further sensitization so that the second dye sensitizer is caused to sensitize only those areas unoccupied by the first dye sensitizer and effectively provides a second plurality of intervening and differently color-sensitized screen elements containing at least diffusible silver-image-forming components; to provide a film structure, for use in an additive method of colored image synthesis, which includes, adjacent a photosensitive emulsion thereof, a layer of screen elements containing a diffusible dye or dyes differing in color characteristics from those of a layer comprising aligned screen taking filter elements of the film structure; and to provide a film structure which permits the excising of a complete film assembly comprising negative and positive image-carrying portions from a film strip of which the assembly originally formed a part, whereby the positive print can be stripped from the negative after the excised assembly has been removed from a camera.

Other objects of the invention will in part be obvious and will in part appear hereinafter.

The invention accordingly comprises the several steps and the relation and order of one or more of such steps with respect to each of the others, and the product possessing the features, properties and the relation of elements which are exemplified in the following detailed disclosure, and the scope of the application of which will be indicated in the claims.

For a fuller understanding of the nature and objects of the invention, reference should be had to the following detailed description taken in connection with the accompanying drawings wherein.

It will be observed that certain of the procedures and constructions of the present invention involve the diffusion transfer of silver-image-forming and color-providing elements to obtain a completed color print. It is further to be noted that the aforesaid procedures and constructions are particularly calculated to provide rapid and efficient performance of the diffusion transfer step or steps through the dispensing to a film material in a darkened environment of a metered quantity of a processing fluid. This operation can be performed conveniently and correctly in a self-processing camera of a type for applying progressive compression to a film assembly after its photographic exposure as, for example, in a camera such as that previously mentioned. An advantage accruing to the method of the invention, when exposure and processing are performed in a proper camera, includes that of bringing together, exactly and under controlled compression, the emulsion and image-receiving surfaces which have been specially prepared for the rectilinear transfer therebetween of the silver-image-forming and color-providing screen elements. A further advantage resides in limiting contact of the processing fluid to certain surfaces of the film assembly where such a limitation is desirable or essential to the rectilinear transfer of the screen elements. The foregoing procedures, taken with others of the invention and with the novel film constructions to be described hereinafter, are calculated to provide a satisfactory order of color and image fidelity. Further considering the present invention in a somewhat broader sense in its relation to the photographic art, it will be apparent that the provision of a practical method and materials for forming color prints in a camera which has heretofore been limited to a black-and-white process constitutes a distinct advantage.

Figure 1:
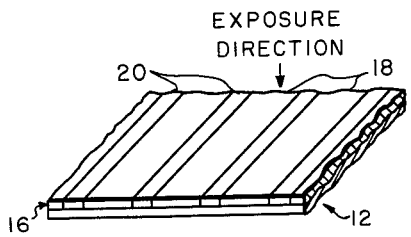
FIGURE 1 is a diagrammatic, fragmentary perspective view of a photosensitive, screen-type, film assembly of the invention for use with an image-receiving film or layer and a processing fluid in a self-processing camera.

Referring to FIG. 1, there is illustrated a fragmentary section of a film assembly 12 which, after its photographic exposure, is adapted to be superimposed and compressed with an image-receiving sheet or surface (not shown) and to be subjected during its compression to a processing fluid which may be releasably contained between the film and receiving sheet. The aforesaid procedures, preferably performed in a suitable self-processing camera, are capable of producing a colored image on, or within, the image-receiving element. The image-receiving sheet is either supplied separately and metered to the processing location, or it is furnished attached to the film assembly in a suitable manner. The film assembly 12 comprises a base 14 of any suitable material, namely, a paper or a plastic such as cellulose acetate, subcoated as may be necessary and having an orthochromatic emulsion 16 coated thereon. After the emulsion 16 has been hardened, it is treated to form a geometric screen arrangement composed of screen elements 18 and screen elements 20. Although the screen elements are represented as lines, they could be in the form of some other configuration such as dots and, indeed, the latter type of element, being less discernible as an individual entity, may be preferred for providing the best color and image representation in the completed print. Thus, wherever lines are shown or mentioned hereinafter, it will be understood that the language is intended to cover substantially any other type of screen element.

Screen lines 18 constitute those areas of orthochromatic emulsion 16 which have been treated with a solution comprising a dye sensitizer such as a red dye sensitizer and a diffusible dye such as a reddish dye, this solution being applied by a suitable printing technique similar, for example, to that of lithography, photogravure, offset printing, screen printing, or the like, which is adapted to the formation of sharply defined screen elements such as lines or dots to the number of 200 to 300 to the inch. A suitable dye for the purpose is Brilliant Paper Yellow, manufactured by E. I. du Pont de Nemours and Co., Wilmington, Delaware, (Direct Yellow 4, C.I. 24890, Color Index, 2nd Edition). This dye becomes red in the presence of an alkali of a processing fluid, to be described below. An appropriate dye sensitizer for use therewith is 3,3'-diethyl-9-methyl-4,5,5',5'-dibenzothiocarbocyanine chloride. Lines or interstices 20, positioned between each pair of the lines 18, are composed of the untreated portions of the orthochromatic emulsion.

Assuming film 12 to have been photographically exposed in the direction indicated, a latent negative image of the "warm" or "reddish" color content of the photographic subject is contained in the red-sensitized emulsion lines 18 and a latent negative image of its "cool" or "greenish" color content is contained in the orthochromatic emulsion lines 20. Film 12 is then processed by imbibing a processing fluid into the emulsion elements 18 and 20 as, for example, by progressively compressing the film with an image-receiving sheet (not shown) to release a processing fluid from a collapsible container, carried by one of the sheet and film, and to spread the fluid across one of the film and sheet material or between the facing surfaces thereof. A suitable processing fluid may comprise an aqueous solution of a silver halide developer such as hydroquinone, a silver halide solvent of the type of sodium thiosulfate, and an alkaline substance such as sodium hydroxide. It may also preferably contain a thickening or film-forming agent such as a synthetic polymer of the type of sodium carboxymethyl cellulose to provide a desired viscosity.

Upon permeation of the processing fluid into the emulsion layer, the exposed silver halide of the latent image components is reduced to silver and the unreduced silver halide forms a water-soluble silver salt in each of the screen elements 18 and 20, while the reddish dye in the elements 18 is rendered diffusible in the presence of the alkali. The diffusible silver salt and the dye are caused to transfer to the image-receiving surface where the salt is reduced to silver in the form of a screen pattern of color-separation, positive image elements or increments, similar in arrangement to those shown in layer 16. The silver image components representative of the relatively longer wavelength or "warm" color content of the photographic subject are aligned with the transferred reddish dye from elements 18 while the silver image components representative of the relatively shorter wavelength or "cool" color content of the photographic subject are aligned with interstices or lines of the image-receiving surface lying between the reddish lines which, in the process above described, are uncolored. After transfer of the silver-image-forming and color components, the image-receiving sheet or layer is stripped from the emulsion to provide the positive print. Assuming the use of a transparent image-receiving sheet, such as a sheet of cellulose acetate, cellulose triacetate, polystyrene, or the like, having a hydrolyzed image-receiving surface, the print, thus formed through additive synthesis of the "warm" and "cool" color components, is a transparency containing a single color but appearing to include several colors aproximating the colors of the original subject. In this example the transferred reddish screen components constitute long-wave stimuli and the uncolored or white intervening screen components constitute short-wave stimuli which together provide the full range of perceptible colors.

It will be noted in FIG. 1 that the screen lines 18 and 20 are of different width, the purpose being to balance the overall transmisison or luminosity of the light passing through the two sets of screen elements which may be desirable. Alternate methods for a generally similar balancing purpose include such procedures as lessening the density of the reddish dye to more nearly approach the transmission of the undyed screen portions, providing a neutral density in the undyed portions, or incorporating a fluorescent substance with the reddish dye.

In a modification of the method and structure above described it is also possible to include a diffusible greenish dye in the orthochromatic emulsion lines 20 to provide the classical two-color viewing filters, in which instance the lines 18 and 20 may more closely approximate equal width because of a greater similarity of their transmission properties. A suitable greenish dye for the purpose of Solophenyl Fast Blue Green BL manufactured by Geigy Company, Inc., New York, N.Y., (Direct Green 27, C.I. 2nd Edition). Inclusion of the greenish dye provides an additive two-color screen print exhibiting an extended range of perceptible colors which, however, lacks the transmission potential of the red-and-white combination. A generally faithful rendition of the gamut of colors of the photographic subject will be observed by using either of the aforesaid combinations, namely, the reds of the subject will appear as red, the greens as green, the blues as blue, the yellows as yellow, etc.

Various additive combinations other than the reddish and white or the reddish and greenish combinations, above described, are also employable for viewing purposes as long- and short-wavelength stimuli in conjunction with proper color-separation, black-and-white or neutral-toned images. Modification of the taking color-separation means is also possible and, while in no sense excluding this possibility, it may be assumed in the examples which follow that such modification has, in general, not occurred and that the long- and short-wavelength viewing stimuli are employed in conjunction with neutral-toned, color-separation images representative of the longer and shorter wavelengths of the subject, as produced by generally reddish- and greenish-recording taking means, respectively, such as filters and/or dye sensitizers. Some of the possible combinations of long- and short-wavelength viewing stimuli, which have been shifted or transposed in the optical spectrum with respect to the wavelengths of the aforesaid taking means, which are employable therewith, and which distinguish from the above-described combination of the reddish (590 mμ and above) stimulus with white and the conventional two-color combination of red and green, are shown in the following table.

*Table I*

[Values approximate in millimicrons]

| Long-wavelength Stimuli | Short-wavelength Stimuli |
|---|---|
| 550–590. | Up to 580. [1] |
| 550 and above. | 400–450. |
| White. | Up to 580. [3] |
| 590 and above. [2] | 567 and above. |
| 400–430. [4] | 430–490. [4] |

[1] At least 10–25 mμ below wavelength of selected long-wavelength stimulus.
[2] At least 15 mμ above wavelength of selected short-wavelength stiumulus.
[3] 520–560 mμ produces magenta instead of red.
[4] Reversed positions; separation of at least 20 mμ required.

NOTE.—Limits of color ranges, above, in certain instances, approximate the "limits of colors" set forth in "The Entire Electromagnetic Spectrum" compiled by Westinghouse Research Laboratories, Revised Edition, 1942, 1945.

Any of the transposed combinations of wavelength stimuli indicated in the foregoing Table I are, in general, adapted to provide a range of colors which is similar in extent to that present in the photographic subject. It is thought that they may find various applications in the photographic field as, for example, in modification of the color-providing elements of color film structures, in the choice of color filters in a projection system, and the like. Thus, an expanded choice of dyes may be provided to achieve a given color objective, or dyes offering relatively improved diffusion characteristics may be employed, or a gain in light transmittance may be possible.

For a further understanding of the principles underlying the above-described transpositions of wavelength stimuli, reference should be had to Proccedings of the National Academy of Sciences of the United States of America, volume 45, number 1, January 1959, pages 115–129, "Color Vision and the Natural Image," part 1, by Edwin H. Land.

Figure 12:
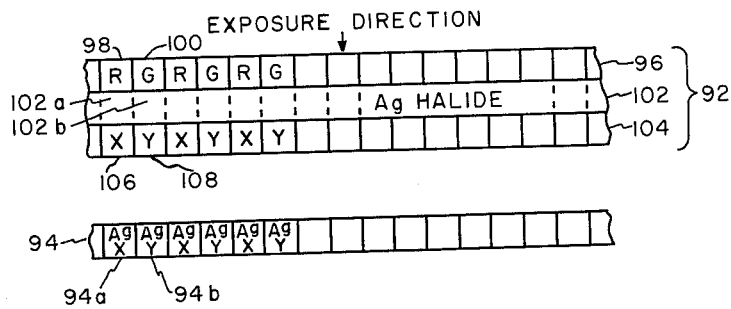
FIG. 12 is a diagrammatic, fragmentary side view of a modified film structure of the invention.

In FIG. 12, a film structure 92 adapted to the transfer of image-forming and color-providing components to an image-receiving, light-transmitting film 94 is illustrated in which the principles exemplified in Table I, and further described below, find practical application. A film base 96 of cellulose acetate, cellulose triacetate, or the like, comprises a geometric screen of red and green taking filter elements 98 and 100, respectively, formed thereon or therewithin in a pattern of dots or lines. A layer 102 of a silver halide emulsion is formed on the base, and a layer 104 comprising a screen arrangement of diffusible color-providing components 106 and 108 is formed on the emulsion 102. Screen components 106 and 108 are optically aligned with the screen filter elements 98 and 100, respectively, and contain diffusible dyes "X" and "Y" adapted to provide long- and short-wavelength stimuli of the type exemplified in Table I. Thus, for example, "X" represents a yellow dye which has a transmission providing a long-wavelength stimulus at approximately 590 millimicrons and "Y" represents a yellow dye of a different transmission characteristic providing a short-wavelength stimulus at approximately 580 millimicrons.

Photographic exposure of layer 102 through the taking screen 96 provides latent color-separation images of the red and green content of the photographic subject in the areas 102a and 102b. Assuming image-receiving element 94 to be brought to superimposed contiguous relation with film 92, an appropriate processing fluid of the type mentioned with respect to FIG. 1 is then applied to a surface of film 92 or to element 94, or between the two. Transfer of silver salt from elements 102a and 102b and transfer of the diffusible dyes from screen components 106 and 108 to the prepared surface of element 94, takes place in a manner generally similar to that also described relative to FIG. 1, the silver salt being converted to silver adjacent the surface. Accordingly, at least the facing surface of image-receiving element 94 has formed thereon an additive screen composed of elements 94a containing an image component in silver representative of the reddish or relatively longer wavelength content of the subject plus the diffused yellow dye "X," and the elements 94b containing a silver image component representative of the greenish or relatively shorter wavelength content of the subject plus the diffused yellow dye "Y." As previously mentioned, the yellow dye "X" provides the long-wavelength stimulus and the yellow dye "Y" provides the short-wavelength stimulus of a combination transposed with respect to the combination of taking filters which is effective in reproducing the gamut of colors of the photographic subject.

A novel and particularly effective combination or system of taking color-separation means and viewing stimuli, capable of providing, in the final multicolored visible image, colors of a quality and range at least the equal of those produced by the heretofore known use of red and white viewing stimuli, is exemplified in the following table:

*Table II*

| Long Wavelength Color-separation Means (taking) | Short Wavelength Color-separation Means (taking) |
| --- | --- |
| None (panchromatic emulsion only). | Panchromatic Emulsion and Greenish Filter Means or Orthochromatic Emulsion (alone or with yellow filter). |

| Long Wavelength Stimulus Means (viewing) | Short Wavelength Stimulus Means (viewing) |
| --- | --- |
| Reddish Filter Means and Image (representing both the long and short wavelength content of the subject). | Greenish Filter Means and Image (representing the short wavelength content of the subject). |

From the foregoing Table II, where, in the left-hand column, it is noted that no long wavelength taking filter means is employed, it will be apparent that both the long and short wavelength color content of the photographic subject are recorded in the panchromatic emulsion and will be contained in the positive, substantially neutral-toned image obtained therefrom by reversal, in situ, or a diffusion transfer step such as that exemplified in FIG. 12. Thus, in conjunction with the reddish filter means for viewing purposes (direct viewing or projection) both the long and short wavelength content of the subject will be represented by this image. However, only the substantially neutral-toned positive image representative of the shorter wavelength content of the subject is identified with the viewing greenish filter means. It will be understood that the two positive image records are visually fused for viewing purposes, either by superimposition or due to their mutual contiguity in a screen structure.

Figure 2:
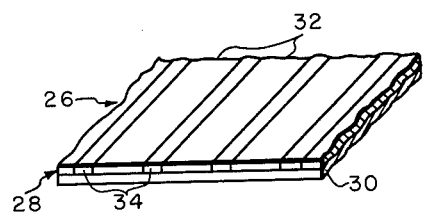
FIG. 2 is a similar perspective view of an image-receiving film material of the invention comprising screen areas which embody a dye and a dye sensitizer.
Figure 3:
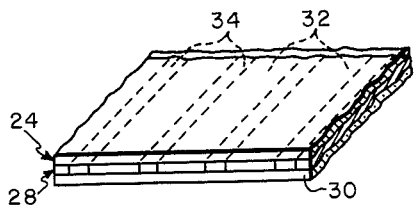
FIG. 3 is a similar perspective view of the film material of FIG. 2 wherein a coating of an orthochromatic silver halide emulsion has been applied to the upper surface.
Figure 4:
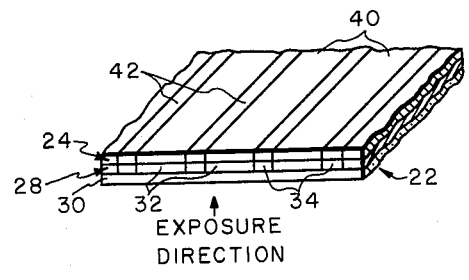
FIG. 4 is a similar perspective view of the film material of FIG. 3 wherein the dye sensitizer of the screen areas has caused sensitization of superimposed portions of the emulsion, a geometric pattern being formed of these portions. The material is intended for use with a fluid restricting or barrier sheet and a processing fluid in a self-processing camera.

FIGS. 2 and 3 illustrate two stages preparatory to the formation of a completed film assembly 22 of FIG. 4, the latter assembly including a differentially sensitized silver halide emulsion layer 24 and an image-receiving element 26. Element 26 comprises an image-receiving layer 28 composed, for example, of carboxymethyl cellulose and formed on the hydrolyzed surface of a transparent base 30 of cellulose acetate or other suitable plastic material, the layer 28 and base 30 constituting a unitary element. A positive print is provided on the layer 28 by the diffusion transfer thereto of image-forming components from the emulsion layer 24.

As shown in the first stage of the process, exemplified by FIG. 2, the image-receiving surface 28 is composed of screen elements in the form of lines 32 printed thereon by a suitable gravure, litho, slik screen, or other printing procedure. The printing solution contains a dye of a chosen color and a dye sensitizer for a similar color which, for purposes of description, will be considered to be a reddish dye and a diffusible red sensitizer, the dye and sensitizer being included, for example, in an aqueous solution. The dye serves both as a taking and a viewing filter. The intervening screen lines 34 are uncolored and are not treated with a sensitizer. Inasmuch as no photosensitive elements have been included in the structure thus far described, it is possible to apply the printing solution comprising the dye and dye sensitizer to surface 28 in normal light, a distinct advantage in the manufacturing of the film assembly. An overall coating of the silver halide emulsion 24 as, for example, in the form of an aqueous solution of a gelatino silver halide emulsion, is then applied over the surface 28 as shown in FIG. 3, this step, of course, necessarily occurring in the absence of actinic light. The emulsion 24, as applied, is orthochromatic. However, the linear portions 40 of the emulsion which are superimposed with the screen elements 32 of the image-receiving layer containing the red dye sensitizer become red sensitized through diffusion of the water-soluble dye sensitizer thereinto, while the intervening linear portions 42 of the emulsion are unaffected and thus remain orthochromatic. The red dye remains substantially fixed in screen elements 32. An appropriate water-soluble cyanine dye sensitizer for the purpose is 3,3'-diethyl-9-methyl-4,5,4',5'-dibenzothiocarbocyanine chloride. A suitable red dye is Luxol Fast Red BB, manufactured by E. I. du Pont de Nemours & Co., Wilmington, Delaware (C.I. Solvent Red 34, Color Index, 2nd Edition). Upon completion of the steps illustrated by FIGS. 2 and 3, the assembly of FIG. 4 is provided and is composed of the following transparent elements. An image-receiving layer 28 is carried by base 30 and includes screen lines 32 comprising the fixed filter dye and the undyed intervening lines 34. Emulsion layer 24, formed on the layer 28, comprises red-sensitized screen lines 40 and orthochromatic screen lines 42.

The unit 22 is adapted to be photographically exposed in the direction indicated, screen lines 32 serving as color-separation filters during the exposure. Latent negative images of the "warm" color content, i.e., the longer wavelengths of the subject, are formed in the red-sensitized screen lines 40 and latent negative images of the "cool" color content, or shorter wavelengths of the subject, are formed in the orthochromatic screen lines 42. A processing fluid of the type hereinbefore described with respect to FIG. 1 is then applied to the assembly, preferably to the surface composed of screen lines 40 and 42, to provide the diffusion transfer of silver-image-forming components from screen portions of layer 24 to properly identified screen portions of layer 28.

Figure 5:
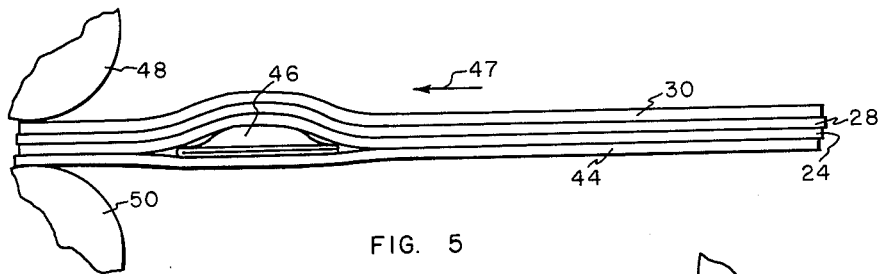
FIG. 5 is a diagrammatic side view of a film material of a type such as that of FIG. 4 in conjunction with a barrier sheet and a releasably-contained processing fluid. The materials are shown as a generally unitary assembly undergoing compression between pressure rolls.
Figure 6:
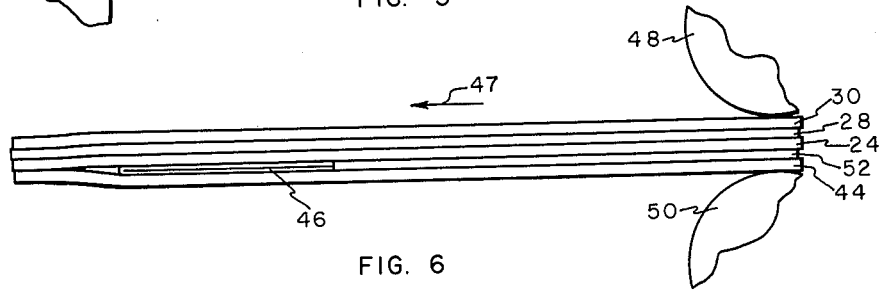
FIG. 6 is a view similar to that of FIG. 5 illustrating the film assembly after compression.

The processing operation to provide a positive color print is illustrated by FIGS. 5 and 6. The assembly of FIG. 4, having been subjected to photographic exposure, is kept free from further exposure to actinic light and is combined, in superimposed relation, with a backing or barrier sheet 44 bearing a collapsible container 46. When the assembly is drawn, in the direction of arrow 47 between compression-applying means such as rollers 48 and 50 located, for example, in the chamber of a camera (not shown), container 46 is collapsed, as illustrated in FIG. 6, and, in response to the progessive application of compression, the fluid 52 is spread between the emulsion layer 24 and the backing sheet 44. The backing sheet may, appropriately, have a pressure sensitive adhesive or other engaging means extending along its longitudinal margins to form a seal with the edges of the film assembly and prevent escape of the processing fluid. The processing fluid permeates at least the layer 24 to provide a substantially rectilinear transfer of the color-separation silver-image-forming components so that those components representative of the "warm" colors which are aligned with the red-dyed screen lines 32 transfer thereto and those components representative of the "cool" colors and aligned with the undyed screen lines 34 transfer to the latter. The processing fluid provides an adhesion between emulsion 24 and backing layer 44 exceeding that of the bond between emulsion 24 and the image-receiving layer 28. Accordingly, emulsion 24 is caused to preferentially adhere to backing layer 44 rather than to image-receiving surface 28 so that the latter, together with base 30, is stripped away from the emulsion as a unit to reveal the positive print, the print being visible as a multicolored image. If a print incorporating screen elements of two colors is contemplated, assuming the lines 36 to be of a reddish color, the lines 38 would also contain a dye, i.e., a greenish dye or a dye consistent with any of the combinations of Tables I or II. It will be understood that the two sets of screen elements could be of similar dimensions under circumstances where relative luminosities or transmissions are balanced, as previously explained.

Figure 7:
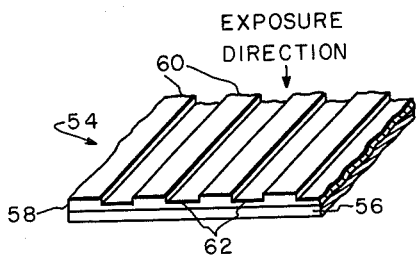
FIG. 7 is a diagrammatic, fragmentary perspective view of a modified photosensitive, screen-type film assembly for use with an image-receiving film and a processing fluid in a self-processing camera.

The film assembly 54 of FIG. 7 illustrates a modification of the film unit of FIG. 1 which similarly involves the selective imbibition of one or more dye sensitizers and a diffusible dye to form the screen elements, but in a somewhat different manner to that previously described. After it has been photographically exposed, the film assembly 54 is adapted to be superimposed with a separate sheet (not shown), subjected to a processing fluid, and processed generally as described with respect to the assembly of FIG. 1.

Film assembly 54 comprises a transparent base 56 preferably composed of a suitable plastic material such as cellulose acetate, polystyrene, or the like, an orthochromatic silver halide emulsion layer 58 formed on the base, and a plurality of screen elements 60 printed on the emulsion layer 58, after it has been sufficiently hardened, by any suitable printing operation of a type hereinbefore mentioned. The screen elements in this example, as in others described herein, may be in the form of dots rather than lines and may preferably compose a geometric pattern, although they could, with the exception of the showing of FIG. 12, constitute an irregular mosaic. A plurality of screen elements 62 composed of the untreated orthochromatic emulsion is thereby provided in the interstices between the elements 60. Screen elements 60 are especially formed to provide a controlled generally rectilinear transfer of certain components of their composition and to prevent the diffusion or migration of others. Each screen element 60 comprises a binder such as cellulose acetate phthalate for providing a desired viscosity or substance thereof, a diffusible dye sensitizer of the nature of a cyanine dye which transfers to the silver halide emulsion layer 58 when the screen lines are applied, a diffusible transfer dye which transfers to at least a layer of the processing fluid, and a nondiffusible filter dye. Assuming, for example, the use of a red dye sensitizer, a transfer dye adapted to assume a red color during processing of the film assembly, and a fixed red filter dye, a suitable dye sensitizer is 3,3'-diethyl-9-methyl-4,5,4',5'-dibenzothiocarbocyanine chloride, a proper transfer dye is Brilliant Paper Yellow, previously mentioned, and an appropriate filter dye is Luxol Fast BB, also described hereinbefore. A processing fluid, adapted to the purpose, which, when solidified, serves, per se, as an image-carrying layer, is described in U.S. Patent 2,662,822. In the presence of the alkali of the processing fluid the cellulose acetate phthalate forms a low molecular weight cellulose acetate which is permeable to water. The aforementioned constituents of each screen element 60 are provided in a proper solvent such as dimethyl sulfoxide. It will be noted that the dye sensitizer transfers in a given direction to emulsion 58 during formation of screen elements 60 and the diffusible dye may also transfer to some extent thereto without a detrimental effect. When the screen elements 60 have hardened, the solvent has evaporated and the dye sensitizer is fixed in emulsion 58. After the photographic exposure, transfer in an opposite direction, responsive to the alkaline processing fluid, to the image-receiving layer formed therefrom is thus limited to the diffusible transfer dye, this being the desired operation. A modification of the film assembly of FIG. 7, above described, provides the emulsion layer 58 as a blind silver halide emulsion instead of an orthochromatic emulsion. The intervening screen lines 26 are then treated with a green dye sensitizer such as erythrosin, the screen lines 60 being of a type rendered nonreceptive thereto.

The screen elements illustrated in FIG. 7 are, of course, greatly exaggerated in height with respect to the thickness of layers 56 and 58. The spacing between the elements 60 is also markedly exaggerated relative to the thickness of the assembly. Exaggeration in the size and spacing of screen elements is also to be noted in other of the illustrations, it being obvious that the provision of from 200 to 250 screen elements to the inch would actually make them individually practically indistinguishable, one from another. In the processing operation, the viscous processing fluid fills the depressed interstices to provide a generally level surface for transfer of the silver-image-forming and color elements throughout the entire area.

Figure 8:
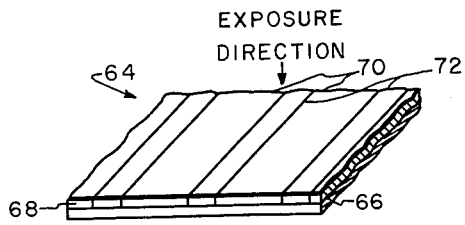
FIG. 8 is a similar perspective view of a photosensitive film element during its manufacture. The film unit is intended to be used with an image-receiving film and a processing fluid in a self-processing camera.
Figure 9:
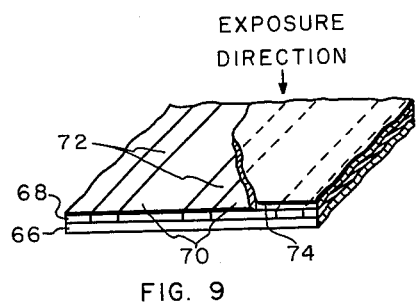
FIG. 9 is a similar perspective view of the film element of FIG. 8 at a further stage of its manufacture.

FIGS. 8 and 9 illustrate two stages in the formation of a film unit for use with an image-receiving sheet and a processing fluid of the nature previously described to form a transparency visible in a gamut of colors. The film assembly 64, as shown in FIG. 8, comprises a base element 66 composed of any suitable paper or plastic material having a blind silver halide emulsion 68 coated thereon. Emulsion 68 comprises the screen elements 70, formed by selectively printing on the emulsion a solution of a selected dye sensitizer and a transfer dye consistent therewith, i.e., a red dye sensitizer and a diffusible red dye, and the intervening screen elements 72 composed of the original untreated emulsion. Incorporation of a sufficient amount of a first, or red, sensitizer in screen elements 70 renders them adapted to be substantially unaffected by any application of a second sensitizer to the emulsion 68. As shown in FIG. 9, a solution of a second dye sensitizer, namely, a green dye sensitizer 74, is then nonselectively applied over the entire emulsion surface. The green sensitizer produces little or no sensitizing effect on the already sensitized screen elements 70 but is accepted by the unsensitized screen elements 72 to render them green sensitive. A red transfer dye and red and green dye sensitizers, similar to those previously described, may be employed in this example, also. If two transfer dyes are to be employed, a second diffusible dye such as Solophenyl Fast Blue Green, previously described, or a pair of dyes adapted to provide the color characteristics exemplified in Tables I or II, may be contained in screen elements 72.

Figure 10:
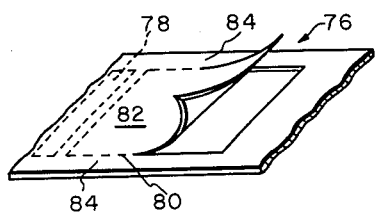
FIG. 10 is a diagrammatic, fragmentary perspective view of a film construction of the invention illustrating a method of removing a section containing a completed photographic print from a larger area or strip of the film.

In FIG. 10 there is illustrated a continuous strip of a self-processing film material 76 embodying a collapsible fluid container 78. As shown, it is to be assumed that the film comprises photosensitive screen elements which have been exposed and processed, the container 78 having been collapsed to release and spread its fluid contents between layers of the assembly for processing purposes. The film assembly may, for example, be of the form shown in FIGS. 4 and 5, namely, one incorporating an emulsion composed of differential screen portions, an image-receiving layer and a backing layer, or it may be composed of one of the assemblies of FIGS. 1, 7 or 9 in combination with an image-receiving layer, such a combination having been described, above, relative to each of these assemblies. The special feature of the construction is that the semiperforations 80 permit removal, as a unit, of the entire assembly 82 comprising both the developed negative and the positive from other portions of the strip. The strip is maintained as a continuous entity by means of the remaining marginal areas 84 and thus serves as a connecting means or leader for drawing succeeding portions of the film strip to exposure and processing positions. This construction makes possible the immediate removal of the processed film assembly 82 from a self-processing camera (not shown) of a type previously mentioned which includes access means to a processing chamber. Accordingly, it permits the rapid exposure of succeeding film areas without waiting to complete the processing of a preceding exposed area. After removal of the film assembly 82 from the processing chamber, the positive element thereof can be stripped from the negative element, exteriorly of the camera.

Figure 11:
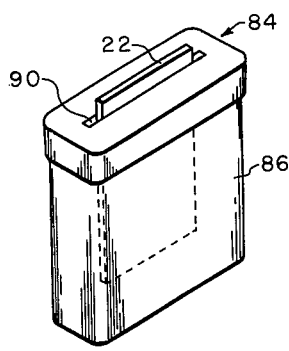
FIG. 11 is a diagrammatic, perspective view illustrating an alternate method of applying a processing fluid to a film material of the invention.

FIG. 11 illustrates an alternate method of applying a processing fluid to a film assembly such as that of FIG. 4, which obviates the requirement for the backing layer and the collapsible fluid container, shown therewith in FIGS. 5 and 6. A small, portable processing container 84 includes a compartment 86 formed of a material opaque to actinic light such as an opaque polyethylene. It is provided with a resilient rubber or synthetic cap 88 in which is formed a normally tightly-closed slot 90. Compartment 86 contains a processing fluid of the type above described. Following its exposure, the film assembly is maintained free from further subjection to actinic light and is inserted through the slot 90 and subjected to the processing fluid for the short time prescribed to form the positive color print, after which it is removed from compartment 86 and the emulsion is stripped or peeled from the image-receiving surface. The container 84 may be supplied with slot 90 completely sealed by a membrane which can be severed by a knife or by the fingernail at the time of processing the first of several films. Additional clamping means (not shown) may additionally be provided to insure that slot 90 is always kept completely closed when the container is not in use.

Although diffusible dyes have been stipulated herein as the color-providing substance for forming the positive color print or transparency, it will be understood that a dye intermediate such as a diffusible color former or coupler may be employed for the purpose and the color provided through treatment with an oxidizing agent, provided no function of a taking filter is also required of the color-providing substance. It will also be understood that certain of the ingredients of the processing fluid, i.e., a developing agent, may be contained in a layer of the film assembly, rather than in the fluid, per se, and that it may be released by the fluid.

It is well known that in a screen process, color and image degradation tend to result from the angular scattering of light of exposure by silver halide particles. This results in the nonalignment of related color and silver-image-forming densities. The present invention minimizes this fault by providing diffusion transfer of the silver-image-forming components from that surface of the emulsion at which is located the apex from which the light scatters in somewhat conical fashion rather than from an emulsion surface at which extensive scattering has occurred.

While the combination of a relatively long wavelength stimulus such as red with an effectively shorter wavelength stimulus such as white, and various other transposed combinations of stimuli have been presented hereinbefore, more particularly with respect to film structures and projection systems, i.e., dyes for photographic purposes, they may also find utility in the printing arts and in the field of television. It is readily conceivable that a combination of red screen elements with uncolored screen elements in a pattern similar to that shown in FIG. 1, or screen elements in the aforesaid color combinations, may be employed in the printing art to form a screen pattern on an appropriate base material and that neutral-toned color-separation images derived from proper taking filter means may be printed thereon in correct registration and correctly oriented relation to provide substantially the range of colors of an original photographic subject.

To facilitate printing of the neutral-toned images on the proper screen elements, that is, for example, printing the images representative of the long-wave content of the subject on a first set of screen elements providing the long-wavelength stimulus and the images representative of the short-wavelength content of the subject on a second set of screen elements providing the short-wavelength stimulus, printing inks for forming the images may be selected, each of which has an affinity for only one set of screen elements or the two sets of screen elements may, of themselves be formed of materials which are, respectively, receptive and nonreceptive to the neutral-toned printing ink. An example of a procedure and materials suitable for this type of selective printing of the neutral-toned images on separate sets of screen elements, in contiguous relation, is the use of a greasy ink and a water-soluble ink for printing images on a screen composed, respectively, of a first set of screen elements which is greasy-ink-receptive and water-repellent and a second set of screen elements which is water-receptive and greasy-ink-repellent.

With reference to a television application of the principles set forth herein involving the transposition of color-providing means, it will be understood that electronic or electron-beam-responsive filter-means providing transposed long- and short-wavelength stimuli of the character described can be employed in a television circuit. The viewing filtering means may, for example, involve a combination of two transposed wavelengths or a combination of one transposed wavelength with means providing white light or its substantial equivalent, transposition being relative to the wavelengths identified with taking filter means of the television camera. Thus, the taking filter means of the camera may, for example, provide color separation in the red and the green, whereas the viewing filter means of the television receiver employed therewith may provide a transposed combination of long- and short-wavelength stimuli, both of which are in the yellow, i.e., having monochromatic transmission values substantially at 589 m$\mu$ and 579 m$\mu$, respectively, the image being visible in a gamut of colors generally similar to those of the original photographic subject. Or, the viewing filter means may provide but a single transposed long- or short-wavelength stimulus in conjunction with neutral-toned image components, the other stimulus being provided by white light or a substantial equivalent.

In one television adaptation, the component images which together provide the range of colors of the subject are produced in a television receiving tube having, for example, within a single glass envelope an electron target comprising two types of cathode-luminescent elements, a first element being designed to emit light of a given wavelength transposed in the optical spectrum in the sense previously described herein, and a second element designed to emit substantially white light (the addition of a plurality of wavelengths) in response to differential electron beams initiated by "color separation" signals from the transmitter. Alternatively, both cathode-luminescent elements may emit light of transposed wavelengths of the character described.

In another television adaptation, frames of black-and-white film, such as negatives containing color-separation images of a photographic subject, i.e., representing the red and green content of the subject, are scanned at the transmitter. An image possessing substantially the color range of the subject may be produced at the receiver by sequentially illuminating the luminescent screen from a supplementary source of illumination with light of one, or a pair, of colors of transposed wavelength of the character described in synchronism with the properly associated color-separation images produced by the electron beams in the receiving tube.

A rotatable viewing filter device, incorporating colored filter elements having transposed transmission values of the type described herein, and rotated in proper synchronism with color-separation images projected on the luminescent television screen provides another modification of the viewing means. A still further modification contemplates the use, in conjunction with suitably oriented images projected on a television screen, of a light-polarizing viewing filter of the general type disclosed in U.S. Patent No. 2,493,200, but employing one- and two-color filtering elements providing light of transposed wavelengths, in accordance with the principles disclosed in the present invention. Alternatively, filter means of the receiving tube, i.e., phosphors producing two differential color effects and selectively responsive to an electron beam or beams, may be employed to provide the transposed long- and short-wavelength viewing stimuli. Other television adaptations of the transposed wavelength combinations of the present invention will undoubtedly be apparent to those skilled in the art and are deemed to fall within the scope thereof.

Since certain changes may be made in the above product and process without departing from the scope of the invention herein involved, it is intended that all matter contained in the above description or shown in the accompanying drawings shall be interpreted as illustrative and not in a limiting sense.

What is claimed is:

1. A novel method of producing a photographic image which exhibits a substantially complete gamut of colors comprising the steps of photographically exposing to a multicolored subject photosensitive silver halide emulsion portions of a film material which are sensitive to substantially all visible wavelengths to provide therein a first latent negative image representative of substantially the entire color content of said subject, photographically exposing photosensitive silver halide emulsion portions of a film material preferentially to a wavelength range of the color content of said subject of substantially 490 to 570 millimicrons to provide therein a second latent negative color-separation image representative of said wavelength range, and processing said emulsion portions to develop said latent images and provide through a suitable photographic image-reversal procedure a first positive image record form said first latent negative image and a second positive image record from said second latent negative image, said first positive image record being rendered visible in light substantially within a wavelength range of 590 millimicrons to the upper limit of the visible spectrum and said second positive image being rendered visible in light substantially within said wavelength range of 490 to 570 millimicrons, said positive images being relatively positioned so as to be contiguous and to appear visibly fused.

2. A method of providing a photographic image, as defined in claim 1, wherein said first positive image record is produced through the medium of reddish color-providing substance and said second positive image record is produced through the medium of a greenish color-providing substance.

3. A method of providing a photographic image, as defined in claim 2, wherein said positive image records are components of a multicolored photographic print.

4. A method of providing a photographic image, as defined in claim 1, wherein there is employed, as said first-named emulsion, a panchromatic emulsion.

5. A method of providing a photographic image, as defined in claim 1, wherein there is employed, as said second-named emulsion, a panchromatic emulsion, and wherein exposure thereof is performed using a green filter.

6. A method of providing a photographic image, as defined in claim 1, wherein there is employed, as said second-named emulsion, an orthochromatic emulsion.

7. A novel method of producing a photographic image which exhibits a substantially complete gamut of colors comprising the steps of photographically exposing to a multicolored image photosensitive silver halide emulsion portions of a film material which are sensitive to substantially all visible wavelengths to provide therein a first latent negative image representative of substantially the entire color content of said subject, photographically exposing other photosensitive silver halide emulsion portions of said film material preferentially to a wavelength range of the color content of said subject of substantially 490 to 570 millimicrons to provide therein a second latent negative color-separation image representative of said wavelength range, and processing said film materials to develop said latent images and provide through a suitable photographic image-reversal procedure a first positive image record from said first latent negative image and a second positive image record from said second latent negative image, and projecting said first image record in reddish light and said second image record in greenish light to substantial superimposition on a projection screen.

8. A method of producing a photographic image, as defined in claim 7, wherein said first-named emulsion is a panchromatic emulsion and said second-named emulsion is one of a panchromatic emulsion exposed through greenish filter means, an orthochromatic emusion alone, and an orthochromatic emulsion exposed through yellow filter means.

References Cited by the Examiner

UNITED STATES PATENTS

| | | | |
|---|---|---|---|
| 432,530 | 7/1890 | Ives | 96—24 |
| 755,983 | 3/1904 | Wood | 96—24 |
| 1,383,460 | 7/1921 | Friese-Greene | 96—24 |
| 1,391,310 | 9/1921 | Friese-Greene | 96—2 |
| 2,061,182 | 11/1936 | Zeller | 96—80 |
| 2,707,150 | 4/1955 | Land | 96—3 |
| 2,968,554 | 1/1961 | Land | 96—3 |
| 3,034,890 | 5/1962 | Land | 96—3 |
| 3,077,399 | 2/1963 | Land | 96—24 |

OTHER REFERENCES

Cornwell-Clyne: Colour Photography, Chapman & Hall, London, 1951, pp. 9, 11, 253–276.

NORMAN G. TORCHIN, *Primary Examiner.*

MILTON STERMAN, *Examiner.*

T. D. KERWIN, G. H. BJORGE, J. T. BROWN,
*Assistant Examiners.*